N. SHIELDS.
SPRING MOTOR AUTOMOBILE.
APPLICATION FILED DEC. 17, 1917.
1,297,503.
Patented Mar. 18, 1919.
2 SHEETS—SHEET 1.
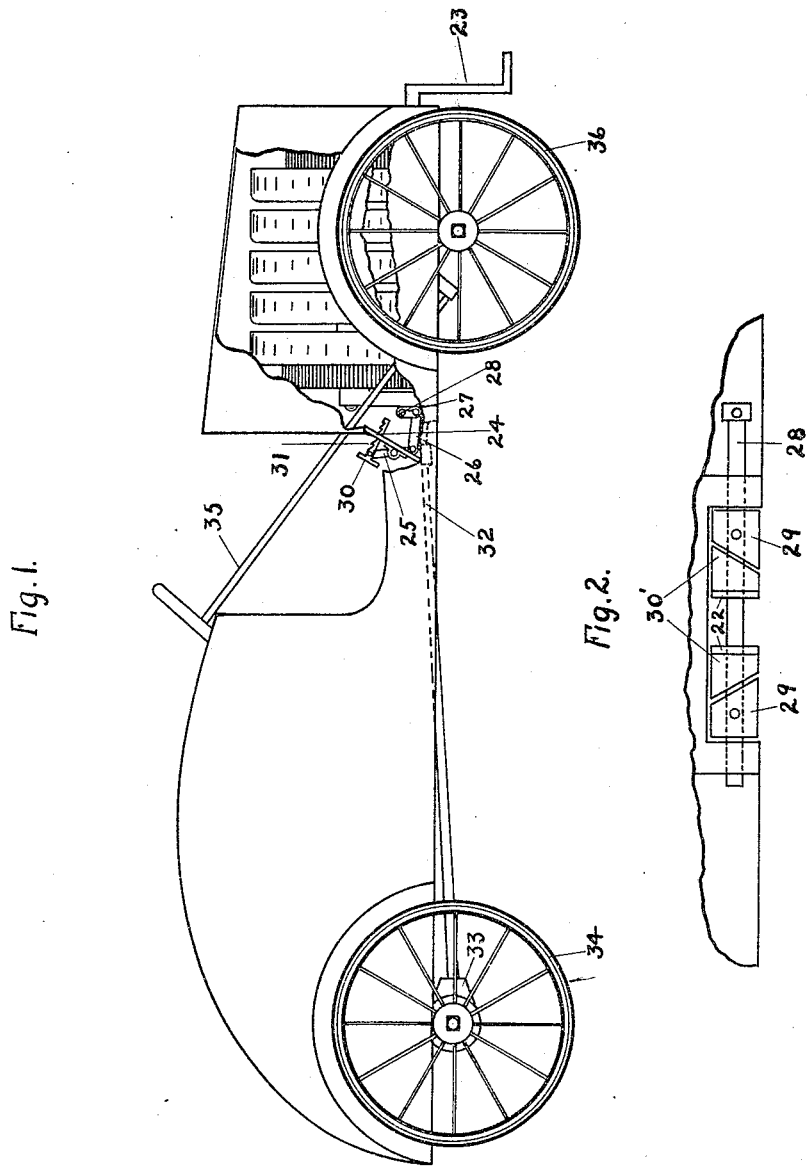
Inventor
Nelson Shields
by C. D. Enochs
Attorney

N. SHIELDS.
SPRING MOTOR AUTOMOBILE.
APPLICATION FILED DEC. 17, 1917.

1,297,503.

Patented Mar. 18, 1919.
2 SHEETS—SHEET 2.

Inventor
Nelson Shields
by C. D. Enochs
Attorney

UNITED STATES PATENT OFFICE.

NELSON SHIELDS, OF MINNEAPOLIS, MINNESOTA, ASSIGNOR OF ONE-FOURTH TO HARLEY J. GUNDERSON, OF MINNEAPOLIS, MINNESOTA, ONE-FOURTH TO JOHN A. NELSON, OF MINNEAPOLIS, MINNESOTA, AND ONE-FOURTH TO FRANK W. ADSIT, OF ST. PAUL, MINNESOTA.

SPRING-MOTOR AUTOMOBILE.

1,297,503.     Specification of Letters Patent.     Patented Mar. 18, 1919.

Application filed December 17, 1917. Serial No. 207,618.

*To all whom it may concern:*

Be it known that I, NELSON SHIELDS, a citizen of the United States, and a resident of Minneapolis, in the county of Hennepin and State of Minnesota, have invented certain new and useful Improvements in Spring-Motor Automobiles, of which the following is a specification.

One object of my invention is to provide a spring motor for driving automobiles or other mechanism.

Another object of my invention is to provide in a spring motor, a series of springs coöperating together, and oil containers for each spring in the series.

Another object of my invention is to provide, with a spring motor, a clutch for holding the tension of the spring.

Another object of my invention is to provide improved means for applying the spring motor to a child's automobile.

With these and incidental objects in view, the invention consists of certain novel features of construction and combination of parts, the essential elements of which are hereinafter described with reference to the drawings which accompany and form a part of this specification.

Figure 3:
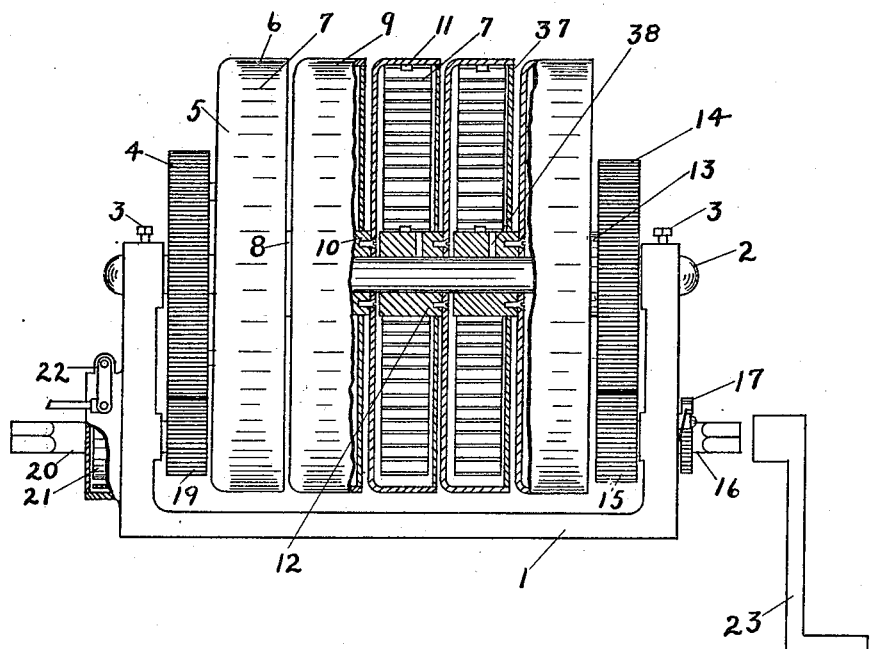

In the drawings, Figure 1 is a side elevation of a child's automobile embodying my invention, with parts broken away to better show the construction; Fig. 2 is an enlarged detail of the clutch operating mechanism; Fig. 3 is an enlarged side elevation of the spring motor with parts of the casings broken away to show the method of attaching the springs, and Fig. 4 is an end view of the spring motor shown in Fig. 3.

Looking at Fig. 3, a motor frame 1 carries a shaft 2 fastened thereto by set screws 3.

Journaled on the shaft 2 is a gear 4 carrying a casing 5 to which is fastened at 6 a spring 7 fashioned into a helix and fastened in turn to a hub 8, likewise journaled on the shaft 2.

Figure 4:
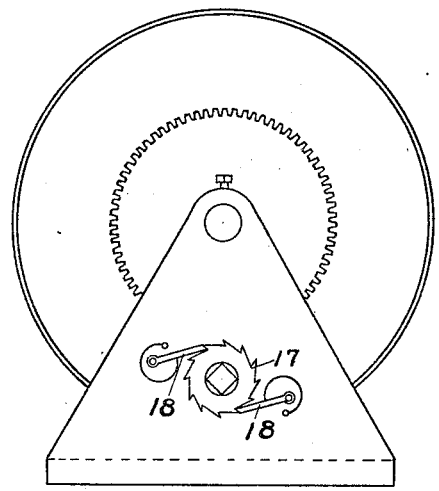

The hub 8 carries a casing 9 to which is fastened a similar spring 7, that spring in turn being fastened to a hub 10, which, in turn, drives the casing 11, carrying a third spring 7 fastened in turn to the hub 12, and any desired number of units are similarly connected, the final unit having its hub 13, carried by the gear 14, journaled on the shaft 2 and coacting with the pinion 15 which is keyed to a crank shaft 16, to which is also keyed a ratchet wheel 17, Figs. 3 and 4, and a pair of spring controlled dogs 18 serve to restrain the motion to a clock-wise movement of the ratchet wheel.

The gear 4 coöperates with a pinion 19 keyed to the shaft 20, which carries a brake drum 21 having a contracting brake band 22, Figs. 2 and 3, co-acting therewith.

If the brake band is clamped to the brake drum, it is evident that the springs of the motor may be wound by turning the shaft 16 with the crank 23 in a clock-wise direction, and the power released as desired by relieving the brake band 22.

Referring to Figs. 1 and 2, a plate 24, carried on the foot board of the car, has hinged thereto a lever 25, which in turn is hinged to a link 26, and that in turn is hinged to an arm 27, keyed or otherwise suitably fastened to the shaft 28.

The shaft 28 carries a pair of cams 29 coöperating with clamping lugs 30' carried by the brake band 22.

It is evident that the rotation of the shaft 28 will contract the brake band, and the foot pedal 30, having a ratchet extension 31 engaging with the plate 24, serves to lock the brake band closed and at the same time provides means for releasing the brake band by tipping the foot pedal 30, thereby releasing the ratchet wheel from the plate 24.

The squared end of the shaft 20 is connected by any suitable means to a propeller shaft 32, which in turn drives through suitable gearing at 33 to the drive wheels 34.

A steering post 35 is provided to control the front steering wheels 36 in a manner well known to those skilled in the art.

With the mechanism as described, it is evident that a child may crank the car with the brake band set, seat himself in the automobile, and by manipulating the foot pedal 30, cause the spring motor to propel the automobile at any desired speed within the limit of the power of the machine, and that the machine may be stopped at will, the clamping of the brake band serving as a brake on the rear wheels as well as on the spring motor itself.

Referring again to Fig. 3, closures 37 are provided for each one of the casings 5 so each of the springs may be run in oil, thereby reducing the friction of the individual springs to a minimum.

Oil wicks 38, leading from the inside of the casings to the shaft 2, provide lubrication for the shaft and hubs from the oil carried in the closures.

While I have described my invention and illustrated it in one particular design, I do not wish it understood that I limit myself to this construction, as it is evident that the invention may be varied in many ways within the scope of the following claim.

Claim:

In a child's automobile the combination of a spring motor, a crank positioned at the front end of the automobile and adapted to wind said spring motor, a power shaft extending from said spring motor, and connected to the drive wheels of the automobile, a brake co-acting with said power shaft, and a foot pedal carried by the automobile and controlling means for contracting or releasing said braking means.

NELSON SHIELDS.